Aug. 10, 1965

W. J. McCLIVE

3,199,894

VEHICLE HITCHES AND WHEEL COUPLING MEANS THEREFOR

Filed Jan. 30, 1962

INVENTOR.
WILLIAM J. McCLIVE
BY Lilly & Nyhagen
ATTORNEYS

Aug. 10, 1965 W. J. McCLIVE 3,199,894
VEHICLE HITCHES AND WHEEL COUPLING MEANS THEREFOR
Filed Jan. 30, 1962 4 Sheets-Sheet 3

INVENTOR.
WILLIAM J. McCLIVE
BY Lilly & Nyhagen
ATTORNEYS

Aug. 10, 1965 W. J. McCLIVE 3,199,894
VEHICLE HITCHES AND WHEEL COUPLING MEANS THEREFOR
Filed Jan. 30, 1962 4 Sheets-Sheet 4

INVENTOR.
WILLIAM J. McCLIVE
BY Lilly & Nyhagen
ATTORNEYS

United States Patent Office 3,199,894
Patented Aug. 10, 1965

3,199,894
VEHICLE HITCHES AND WHEEL COUPLING
MEANS THEREFOR
William J. McClive, 24019 Hartland St.,
Canoga Park, Calif.
Filed Jan. 30, 1962, Ser. No. 169,732
9 Claims. (Cl. 280—483)

This invention relates generally to improved vehicle hitches designed for connection to the rear wheels of towing vehicles.

In my copending application Serial No. 50,982, filed August 22, 1960, and entitled Single-Wheeled Concrete Mixer and Vehicle Hitch Therefor, I disclose a hitch, for attaching a vehicle to be towed directly to the rear wheels of the towing vehicle.

This direct attachment of a towed vehicle to the rear wheels of a towing vehicle has several advantages. Perhaps the foremost advantage is that the forces which react on the towing vehicle from the towed vehicle are transmitted through the rear wheels of the towing vehicle directly to the ground and not through the spring supported chassis of the towing vehicle.

A second important advantage in attaching a towed vehicle to the wheels of a towing vehicle is that the wheels are sufficiently rugged to withstand the towing loads while, vehicle bumpers are not designed to withstand loads of the magnitude involved in the towing of relatively heavy vehicles.

A third advantage of such wheel couplings is that the latter can be attached to towing vehicles with greater facility than can conventional vehicle hitches. Also, my vehicle hitch can be designed for attachment to a greater number of different makes of automotive vehicles than can any one type of existing vehicle hitch because of the fact that it utilizes the only common denominator now available on automobiles for coupling purposes, namely, the wheel lugs. Another advantage resides in the fact that while the axle bearings on the present compact cars are relatively light and incapable of supporting the added load of a trailer, my present vehicle hitches include their own bearings between the trailer load and the ground, whereby my hitches permit the towing of heavy trailer loads by present-day compact cars.

In my prior vehicle hitch, the wheel coupling plates are only rotatably mounted on the hitch arms. The coupling plates are, therefore, capable of one motion only with respect to the hitch arms, namely, rotation on fixed axes. Coaxially arranged about this axis of each coupling plate are a multiplicity of holes for receiving studs to be threaded on the lug bolts of a rear wheel of the towing vehicle. These studs serve to attach the coupling plates to the rear wheels and the latter to the rear axle of the towing vehicle.

I have now discovered that while the concentricity of the lug bolts on each wheel of an automotive vehicle to the wheel axis is accurately maintained, a tolerance on the order of .125 inch is permitted in the depth of the lug nut recesses in the wheel spiders, which recesses seat the mounting lugs for the wheel coupling plates of my prior hitch, as well as my present hitches. Accordingly, when my prior vehicle hitch is attached to the rear wheels of a towing vehicle, each wheel coupling plate may be displaced slightly from a plane normal to the wheel axis by an amount related to the .125 inch tolerance permitted in the depth of the lug nut recesses. Deviation of each wheel coupling plate from a plane normal to the respective wheel axis, of course, results in wobble motion of each plate. Since the wheel coupling plates are capable of rotation only with respect to their hitch arms, this wobble motion of the coupling plates causes gyratory motion of the ends of the hitch arms, twisting of the arms, binding in the coupling plate bearings, and rapid wear of these bearings. These eccentric motions caused by deviation of the wheel coupling plates from planes normal to their respective wheel axes are preferably eliminated.

A general object of the present invention is to provide improved vehicle hitches of the character described having unique wheel coupling plates which are swivelly and rotatably mounted on the hitch arms in such a way that wobble motion of the coupling plates from the causes outlined above is accommodated without undesirable wear in the coupling plate bearings, gyratory motion of the hitch arms or twisting of the latter.

In the vehicle hitch of my copending application, the hitch arms are swingable toward and away from one another to vary the spacing between the arms for different width automobiles, and this adjustment causes slight angulation of the coupling plate axes. Accordingly, only limited adjustment of the spacing between the arms of my prior vehicle hitch is permitted if undue wear in the coupling plate bearings is to be avoided.

The unique swivel and rotary mounting means for the wheel coupling plates of the present vehicle hitches accommodate greater adjustment of the hitch arms without creating binding and excessive wear in the bearings.

Certain types of automotive vehicles have independent rear wheel suspension systems. The wheel coupling plates of my prior hitch, being restrained to rotation on fixed axes, rendered my prior hitch incapable of use with vehicles having such independent rear wheel suspension systems. In my present hitches, the wheel coupling plates are capable of swiveling with respect to one another and with respect to their hitch arms so that my present hitches can be used on automotive vehicles having independent rear wheel suspension systems.

It is, acordingly, another object of the present invention to provide vehicle hitches of the character described which are capable of use on automotive vehicles having independent rear wheel suspension systems.

Yet another object of the invention is to provide vehicle hitches of the character described wherein the center of gravity, or the center of thrust, of the load exerted on each wheel coupling plate by its respective hitch arm is located in the plane of the respective coupling plate, whereby lever action on the wheel coupling plates is eliminated and only shear forces are applied to the studs which secure the plates to the wheels, with the result that on most automobiles, it is possible to utilize only a few of the total number of lugs on the towing vehicle wheels for attaching the wheel coupling plates, leaving the remaining lugs on each wheel undisturbed, thereby providing a greater margin of safety and permitting greater ease and speed of attachment as well as greater trailer loads.

According to another aspect of the invention, the vertical support for the rear end of the hitch frame is furnished by a connection between the frame and the towed vehicle, usually consisting of a chain attached to the latter vehicle and to a torque arm on the hitch frame.

A further object of the invention, therefore, is to provide vehicle hitches of the character described in which the rear ends of the hitch frames, and the weight of the towed vehicles supported thereby, are vertically supported in a unique way.

An object of the invention closely related to the foregoing object is to provide a vehicle hitch of the character described in which the rear end of the hitch frame and the weight of the towed vehicle carried thereby are supported by a unique torsion spring system.

Other objects, advantages, and features of the invention will become readily evident as the description proceeds.

Certain presently preferred embodiments of the invention will now be described in detail by reference to the attached drawings, wherein.

Figures 1, 2, 3:
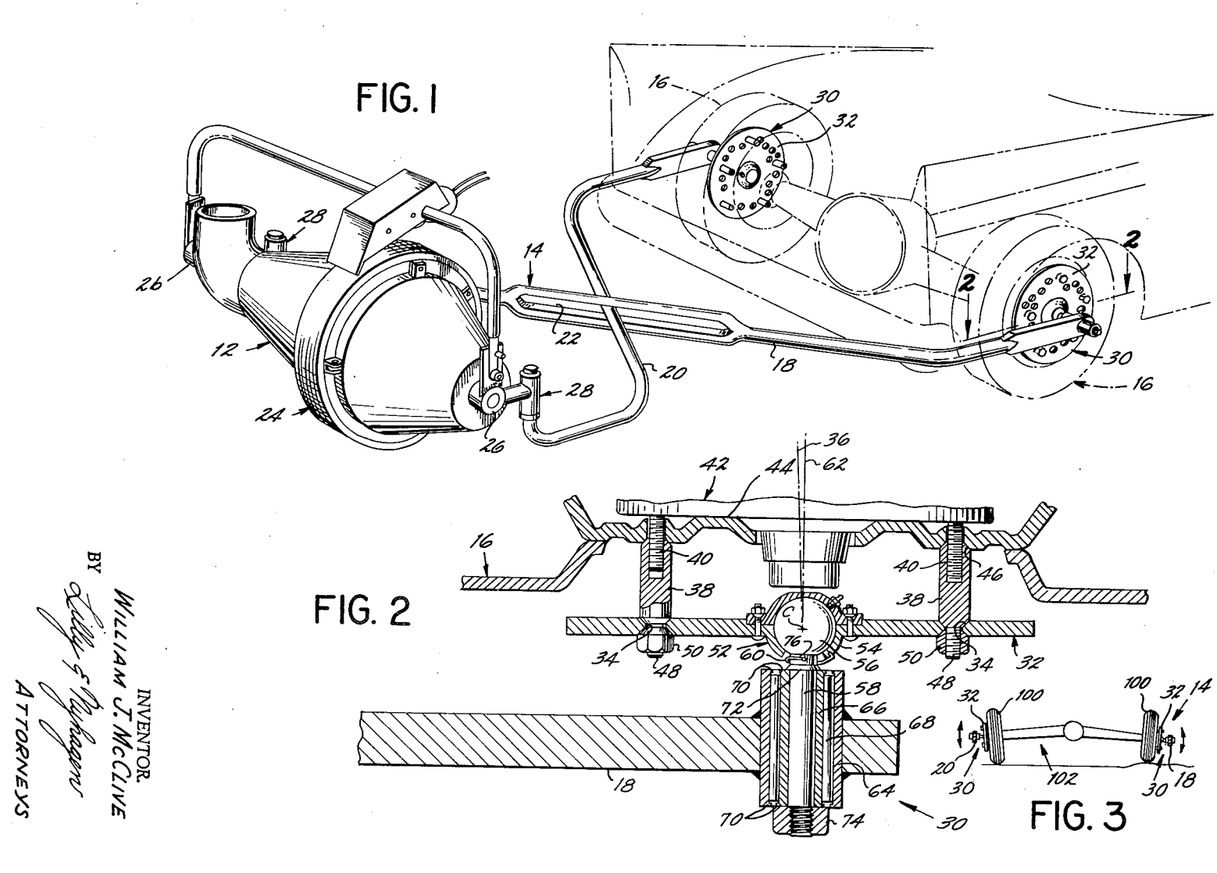
FIG. 1 is a view, in perspective, of my prior concrete mixing and transporting drum attached to a towing vehicle by means of a hitch embodying the improved wheel coupling means of this invention.
FIG. 2 is an enlarged section taken along line 2—2 in FIG. 1.
FIG. 3 illustrates the rear wheels of an automotive vehicle having a rear wheel independent spring suspension system, illustrating one form of the present vehicle hitch attached to the wheels.

In FIG. 1 of these drawings, there is illustrated a conventional passenger vehicle 10, a vehicle 12 to be towed, and a vehicle hitch 14 for attaching the towed vehicle 12 to the rear wheels 16 of the passenger vehicle 10. The towed vehicle 12 in FIG. 1 comprises the concrete mixing and transporting drum disclosed in my aforementioned copending application and the vehicle hitch 14 is of the type also disclosed in my copending application. Briefly, the vehicle hitch 14 comprises a pair of crossed hitch arms 18 and 20. Hitch arm 18 has a slot 22 intermediate its ends through which the central portion of hitch arm 20 extends. Hitch arms 18 and 20 are, therefore, slidably interconnected where they cross.

Concrete drum 12 is generally conically tapered at each end and has a single, central ground-engaging tread or wheel 24 on which the drum is balanced by the vehicle hitch 14 and its connection, soon to be described, to the towing vehicle 10. The drum is arranged between the rear ends of the hitch arms 18 and 20 and is rotatably supported at its ends in bearings 26. These drum bearings are attached, by normally vertical pivot bearings 28, to the rear ends of the hitch arms 18 and 20. The hitch arms can, therefore, pivot with respect to the drum 12.

The forward ends of the hitch arms 18 and 20 straddle the rear wheels 16 of the towing vehicle 10 and are connected to these wheels, respectively, by improved wheel coupling means 30 of this invention. The wheel coupling means 30 for hitch arm 18 are identical to the wheel coupling means 30 for hitch arm 20. Accordingly, only one of these wheel coupling means, namely, that illustrated in detail in FIG. 2 for hitch arm 18, will be described. It, of course, will be understood that the following description of the wheel coupling means in FIG. 2 will apply equally well to the wheel coupling means for hitch arm 20.

Referring now to FIG. 2, the wheel coupling means 30 will be seen to comprise a wheel coupling plate or disc 32. This wheel coupling plate has a multiplicity of holes 34 therethrough which are arranged in the pattern best illustrated in FIG. 4. A study of FIG. 4 will show that the holes 34 in the wheel coupling plate 32 are arranged in sets or groups and that the holes in each group are arranged about and equally radially spaced from the central axis 36 of the coupling plate. The different groups of holes will be observed to be arranged at different radial distances from the plate axis 36. The arrangement and radial spacing of each group of holes match the arrangement and radial spacing of the lug bolts on the wheels of certain makes of automotive vehicles. One group of holes, for example, will match the lug bolts on Buicks, Cadillacs, Oldsmobiles, Packards and Pontiacs. Another group of holes will match the lug bolts on De Sotos, Chryslers and Hudsons, and the third group of holes will match the lug bolts on Mercurys, Plymouths, Studebakers and so on. Accordingly, when the coupling plate 32 is aligned with the wheel of the particular towing vehicle on which it is to be used, the lug bolts on that wheel will be aligned with one group of holes in the plate.

Returning now to FIG. 2, the coupling plate 32 is attached to its adjacent wheel 16 of the towing vehicle 10 by studs 38 which are axially bored and threaded at one end for threaded engagement on the lug bolts 40 of the wheel. When installing the coupling plate 32, the lug nuts on the wheel are removed and the studs 38 are threaded on the lug bolts 40 in their place. The studs 38, therefore, serve to secure the wheel 16 to the brake drum 42 of the vehicle 10. The spider 44 of each wheel of an automotive vehicle is formed with depressions or seats 46 for the original lug nuts of the wheel. The ends of the studs 38 will be observed to have tapered ends for engaging in these lug nut seats. As noted earlier, and as will be hereinafter more fully explained, the studs 38 are subjected only to shear forces as a result of the load exerted on the wheel coupling plate 32 by its hitch arm and these shear forces can be safely carried by only a few studs. Accordingly, if desired, only a few of the lug bolts of the towing vehicle wheel, say three lug bolts on a wheel having five lug bolts, need be utilized for attaching the wheel coupling plate 32. The remaining lug bolts and lug nuts can be left undisturbed. This, of course, results in a greater margin of safety and permits the wheel coupling plate to be attached with greater ease and speed.

The other ends of the studs 38 are reduced and threaded, as illustrated at 48. These latter ends of the studs 38 extend through the particular group of holes 34 in the coupling plate 32 which match or are aligned with the lug bolts 40 on the wheel 16. Nuts 50 threaded on the ends 48 of the studs 38 secure the coupling plate 32 to the studs.

In some automobiles, the wheels are attached to the brake drums by cap screws rather than lug bolts and nuts. In this case, the studs 38 are simply turned end for end. It is for this reason the studs are tapered on each end and the wheel coupling plate is countersunk on both sides.

The coupling plate 32 is rotatably and swivelly mounted on the hitch arm 18 by means which include a ball and socket swivel coupling 52. In FIG. 2, this ball and socket swivel coupling comprises a socket element 54, one-half of which is integral with the coupling plate 32 and the other half of which consists of a separate piece bolted to the coupling plate, as shown. Swivelly received within the socket element 54 is the ball element 56 of the swivel coupling 52. This ball element includes an integral, coaxial shaft 58 which extends through an opening 60 in the wall of the socket element 54. The swivel center C of the ball and socket swivel coupling 52 is preferably located in the plane of and on the central axis 36 of the coupling plate 32.

When the coupling plate 32 is assembled on the wheel 16, the plane of the plate may not, and generally will not, be exactly normal to the axis 62 of the wheel 16. Thus, as preliminarily mentioned, the tolerance permitted in the depth of the lug nut seats 46 in the wheel spider 44 is on the order of .125 inch. Since the coupling plate mounting studs 38 are of the same length, and owing to this permitted tolerance in the depth of the lug nut seats 46, the plane of the plate 32 usually deviates slightly from a plane exactly normal to the wheel axis 62, as illustrated, in somewhat exaggerated fashion, in FIG. 2. As a result, the axis 36 of the coupling plate deviates slightly from the axis 62 of the wheel, as shown. Because, however, of the accurate concentricity which is maintained between the wheel axis 62 and the wheel lug bolts 40, in the manufacture of the wheel, and because of the accurate concentricity which is maintained between the holes 34 in the coupling plate and its axis 36, and, further, because of the fact that the swivel center C of the ball and socket swivel coupling 52 is located in the plane of the plate 32, this swivel center will be located approximately on the wheel axis 62 even though the coupling plate is inclined slightly from a normal to the latter axis. During rotation of the wheel 16 with the coupling plate 32 inclined slightly from a normal to the wheel axis 62, of course, the coupling plate undergoes a wobble motion. The ball and socket swivel coupling 52, however, rotates about its swivel center C, which, as just noted, will be approximately on the wheel axis 62 regardless of the inclination of the coupling plate.

Rigidly fixed to and extending through the hitch arm 18 is a sleeve 64 through which the shaft 58 of the ball and socket swivel coupling extends. This shaft is received within the inner race 66 of a bearing. The outer race of which comprises the sleeve 64 and the bearings of which comprise needle bearings 68 between the races. These bearing races will be observed to have shoulders 70 at their ends between which the needle bearings 68 are axially confined. These shoulders form thrust shoulders which prevent relative axial movement of the bearing races 64 and 66. The swivel coupling shaft 58 has an external shoulder 72 which engages one end of the inner bearing race 66 and is threaded at its end to receive a nut 74 that engages the other end of the inner bearing race 66. The swivel coupling 52 and, therefore, the coupling plate 32 are thereby restrained against movement with respect to the arm 18 in the direction of the axis of the swivel bearing shaft 58.

It is evident from the preceding description that the swivel coupling and rotary bearing 64, 66, 68 for each wheel coupling plate 32 swivelly and rotatably mount the coupling plates on their respective hitch arms in such a way that the wobble motion of the plates, discussed earlier, which occurs during their rotation with their respective vehicle wheel 16 is accommodated without causing gyratory motion and twisting of the hitch arms, binding in the bearings, or other undesirable actions which would occur in the absence of the swivel couplings 52. It is obvious, of course, that these swivel couplings allow each coupling plate to swivel relative to its respective bearing shaft 58, which swivelling accommodates the wobble motion of the coupling plate, as just mentioned.

In the wheel coupling means described above, the bearings 64, 66, 68 are provided to accommodate rotation of the coupling plates with their respective wheels and relative to their respective hitch arms. In this case, of course, there is no need to allow for relative rotation of the ball and socket of the swivel couplings 52, and, as a matter of fact, it is desirable to prevent relative rotation of the ball and socket of the swivel couplings to avoid wear. This can be accomplished in various ways. In the drawings, for example, a spring 76 is simply connected between the socket 54 and ball 56 of each wheel coupling to allow relative swivel motion of these parts and yet prevent any appreciable relative rotation of these parts. The greater friction between each ball and its socket than in the bearings 64, 66, 68, of course, will also tend to prevent relative rotation of the balls in their sockets. It is evident, of course, that special swivel couplings which are designed to accommodate both relative rotation and relative swivel motion of their parts may be used in the invention, in which case the separate rotary bearings 64 66, 68 described above may be eliminated.

A second advantage of the wheel coupling means 30 described above is that the fore and aft thrust on the hitch arms 18 and 20 during towing of the vehicle or drum 12, and especially during periods of acceleration and deceleration of the towing vehicle 10, does not transmit any lever action or bending moment to the coupling plates 32, or axial thrust on the lugs 38 which would result from such lever action, owing to the presence of the swivel couplings. Rather, the fore and aft thrust on the hitch arms is transmitted through the swivel couplings to the wheel coupling plates substantially in the plane of the latter, and the studs 38 and lug bolts 40 are subjected only to shear forces which they can safely withstand, even though only a few of the wheel lug bolts are utilized to attach the wheel coupling plates, as discussed earlier.

It is evident from FIG. 1 that the forward ends of the hitch arms 18 and 20 can be swung outwardly or inwardly to vary the spacing between the forward ends of the arms, whereby to accommodate the hitch to different widths of towing vehicles. The swivel couplings 52 embodied in the wheel coupling means 30 of this invention permit a wide range of adjustment of the hitch arms, in this way, so that the vehicle hitch of FIG. 1 can be adjusted to accommodate any width of towing vehicle. The reason for this is, of course, the swivel couplings 52 embodied in the wheel coupling means 30 accommodate the misalignment of the bearings 64, 66, 68 which occurs when the forward ends of the hitch arms are moved toward or away from one another.

A fourth advantage of the present wheel coupling means 30 is evident in FIG. 3, illustrating the vehicle hitch 14 in FIG. 1 attached to the rear wheels 100 of a vehicle having an independent rear wheel suspension system 102. As is well known, this type of suspension system allows independent vertical movement of the wheels, as indicated by the arrows in the figure. It is obvious from this figure that the swivel couplings 52 embodied in the wheel coupling means 30 accommodate this independent vertical movement of the vehicle wheels without causing binding in the rotary bearings of the wheel coupling means. Relative vertical movement of the vehicle wheels, of course, tends to elevate the forward end of one hitch arm with respect to the forward end of the other hitch arm. In the case of the vehicle hitch and concrete drum in FIG. 1, this elevation of one hitch arm with respect to the other hitch arm causes endwise rocking of the drum on its single, central tread 24, which may be undesirable in some cases for the reasons presented earlier. Accordingly, while the present improved wheel coupling means 30 does accommodate attachment of the vehicle hitch and concrete drum in FIG. 1 to a towing vehicle having independent rear wheel suspension, the endwise rocking of the drum which occurs during independent springing of the towing vehicle wheels may, in some cases, limit this usage of the evhicle hitch and drum to relatively smooth terrain.

Figure 4:
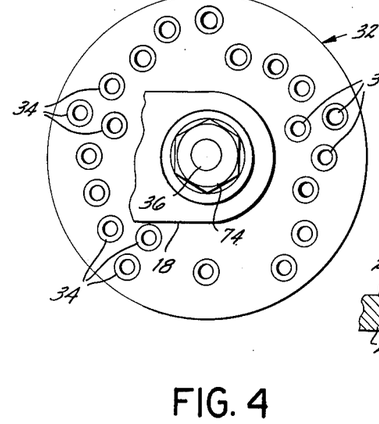
FIG. 4 is a detail of one of the wheel coupling plates in FIG. 1.
Figure 5:
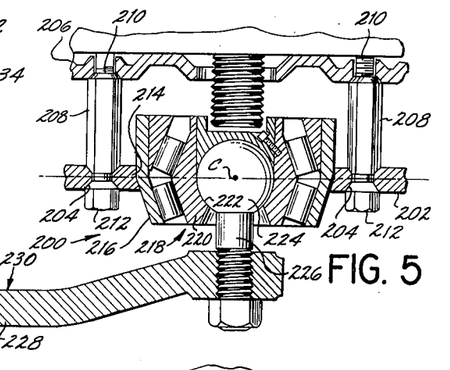
FIG. 5 is a section through a modified wheel coupling plate and the mounting means therefor.

The modified wheel coupling means 200 illustrated in FIG. 5 comprises a wheel coupling plate 202 which may have the same arrangement of holes as the coupling plate 32 in FIG. 4. The coupling plate 202 is attached to a rear wheel 206 of the towing vehicle by studs 208 which, as in the previous form of the invention, are threaded on the lug bolts 210 of the wheel and extend through the proper holes 204 in the plate. Nuts 212 are threaded on these lugs, as before, for securing the coupling plate 202 to the lugs.

Wheel coupling plate 202 has a central opening 214 in which is secured the outer race 216 of a combined rotary and thrust bearing 218. The inner race 220 of this bearing is formed with a generally spherical socket 222 in which is swivelly received a ball 224. The inner bearing race 220 and the ball 224, therefore, form a ball and socket swivel coupling. The swivel center C of this coupling is preferably located in the plane of and is located on the axis of the wheel coupling plate 202, as in the previous form of the invention. When the wheel coupling plate 202 is attached to the rear wheel 206 of the towing vehicle, then, the swivel center C is located approximately on the axis of the wheel, as before.

Integrally formed with the ball 224 is a shaft 226 which is threaded in one arm 228 of a vehicle hitch 230. A lock nut 232 is threaded on the end of the shaft 226 to firmly lock the latter to the hitch arm 228. The forward end of the other arms 234 (FIGS. 6 and 7) of the vehicle hitch 230 is connected to the other rear wheel 206 (not shown) of the towing vehicle 235 by a wheel coupling means 200 identical to that just described. It is obvious that coupling means 200 will allow more movement of the hitch arms with overall less wear on the ball and socket couplings due to the fact that the ball does not rotate with the plate.

Figure 6:
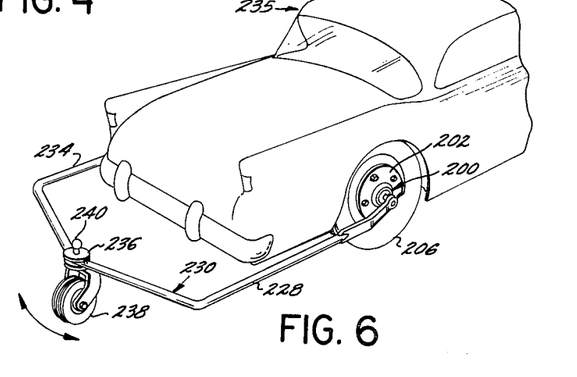
FIG. 6 is a view, in perspective, of a modified hitch according to the invention incorporating wheel coupling means like that of FIG. 5.

In FIG. 6, the arms 228 and 234 of the vehicle hitch 230 will be observed to have a generally L-shape. The rear end portions of these arms extend across the rear end of the towing vehicle 235 and are pivotally joined at their ends by a pivot connection 236 located approximately on the longitudinal center line of the towing vehicle. In this way, the forward ends of the hitch arms 228 and 234 can be swung toward and away from one another to accommodate the hitch to different widths of towing vehicles, as in the previous form of the invention.

Pivotally mounted on the underside of the vehicle hitch 230, approximately on the longitudinal center line of the towing vehicle 235, is a ground-engaging swivel wheel 238. Rigidly mounted on the upper side of the vehicle hitch 230, over the swivel wheel 238, is a coupling part 240 for connection to a cooperating coupling part (not shown) on a trailer 242 to be towed. The coupling part 240 on the vehicle hitch 230 and the cooperating coupling part on the trailer 242 may comprise, for example, a conventional ball and socket coupling. The ground-engaging swivel wheel 238 supports the weight of the rear end of the vehicle hitch 230 and the downward force exerted on the vehicle hitch by the trailer 242.

From the foregoing description, it is evident that the wheel coupling means 200 differ from the wheel coupling means 30, described earlier, in that the socket of the ball and socket swivel coupling 218 is rotatably mounted on the coupling plate 202, whereas in the previous form of the invention, the ball of the ball and socket coupling is rotatably mounted on its respective hitch arm. The wheel coupling means 200, however, possess all the advantages discussed earlier in connection with the previous wheel coupling means 30. Thus, the wheel coupling means 200 accommodate wobble motion of the wheel coupling plates 202, eliminate any lever action or bending moment on the coupling plates 202 under the action of the fore and aft thrust in the hitch arms 228 and 234, accommodate adjustment of the spacing between the forward ends of the hitch arms, by hinging of the latter, to any width of towing vehicle, and, finally, permit adjustment of the vehicle hitch 230 to a vehicle having an independent rear wheel suspension system.

In regard to this latter advantage, it will be recalled that independent springing of the rear wheels of a vehicle having an independent rear wheel suspension system causes relative vertical movement of the forward ends of the hitch arms. The arms 228 and 234 of the vehicle hitch 230 may be fabricated of spring steel, as illustrated, in order to afford the hitch arms with the ability to flex during independent springing of the rear wheels of the towing vehicle having an independent rear wheel suspension system. It is also evident that this spring steel construction of the vehicle hitch 230 is desirable in the case of automotive vehicles having conventional rear wheel suspension systems. Thus, even in the case of a vehicle having a conventional rear wheel suspension system, when one rear wheel goes over a bump, that wheel becomes elevated with respect to the other rear wheel. In both types of rear wheel suspension systems, the spring steel construction of the vehicle hitch 230 allows the hitch arms to flex independently of one another so as to accommodate relative vertical movement of the forward ends of the hitch arms without causing appreciable sidewise tipping of the trailer or other vehicle being towed.

Figure 7:
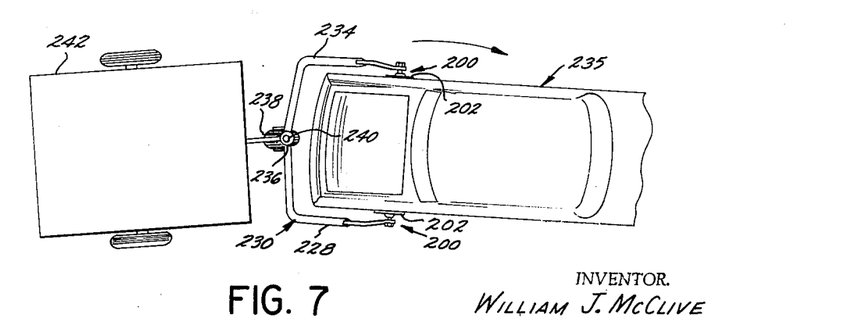
FIG. 7 is a top plan view of the vehicle and vehicle hitch in FIG. 6, illustrating a towed vehicle attached to the hitch.

In the vehicle hitch of FIGS. 5–7, a ground-engaging wheel is employed to support the weight of the rear end of the hitch and the weight to the towed vehicle carried by the hitch. FIGS. 8–11 illustrate an alternative means for supporting these weights. The vehicle hitch 300 illustrated in these latter figures comprises a pair of generally L-shaped hitch arms 302 including sections 304 that straddle the rear wheels 306 (only one visible) of the towing vehicle 308 and sections 310 which extend transversely across the rear end of the towing vehicle. The hitch arm sections 304 are made telescopically adjustable, to vary their length, in any suitable way, such as by the bolt and slot means 312 illustrated. The forward ends of the hitch arms 302 are connected to the rear wheels 306 of the towing vehicle by the wheel coupling means 30 described earlier.

Figures 8, 9, 10, 11, 12, 13:
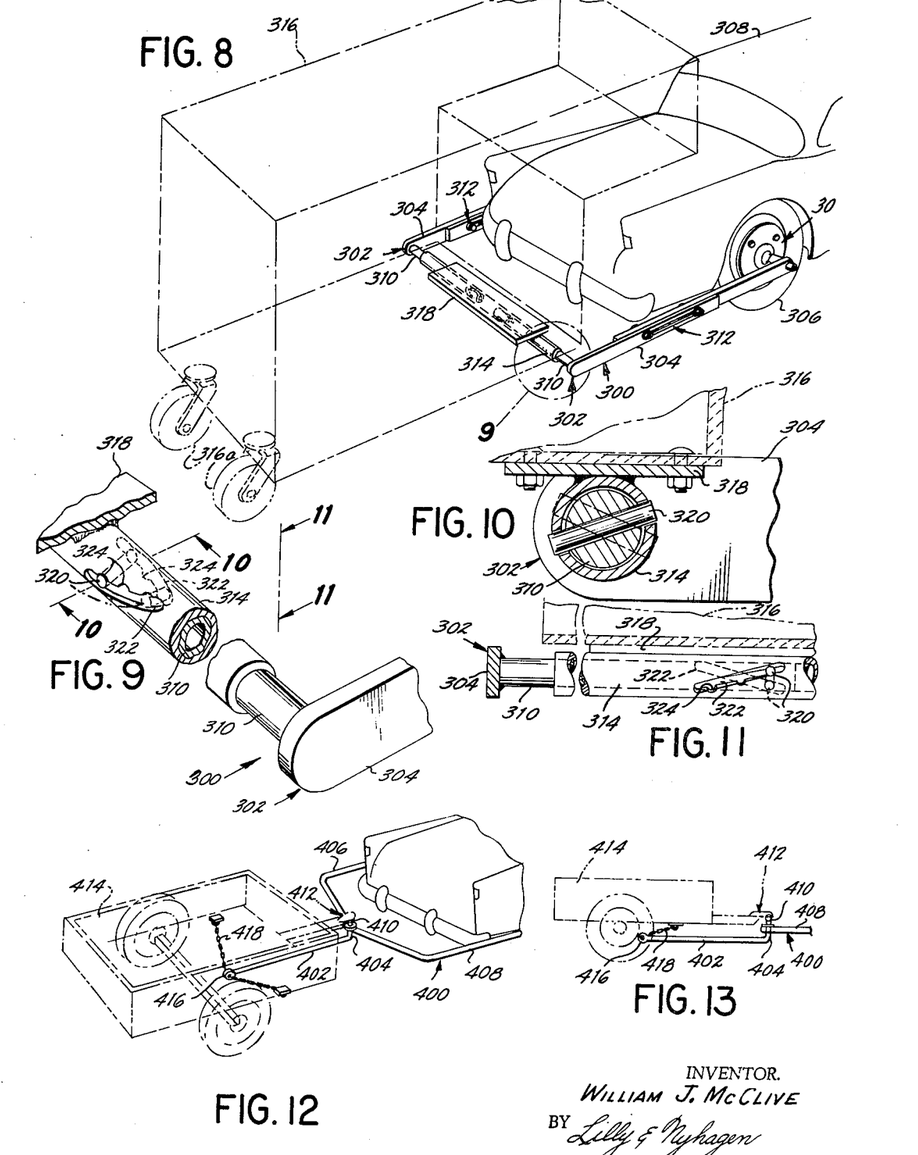
FIG. 8 illustrates a further modified hitch according to the invention for attaching a camper to a towing vehicle.
FIG. 9 is an enlargement of the area enclosed by the circular arrow 9 in FIG. 8.
FIG. 10 is an enlarged section taken along line 10—10 in FIG. 9.
FIG. 11 is a side elevation, on reduced scale, of the structure in FIG. 10.
FIG. 12 illustrates a further modified hitch according to the invention for attaching a conventional two-wheeled trailer to a towing vehicle.
FIG. 13 is a side elevation, on slightly reduced scale, of the hitch and trailer in FIG. 12.

The transverse sections 310 of the hitch arms 302 are designed to possess torsional elasticity. In the illustrated vehicle hitch, for example, the hitch arms sections 310 comprise torsionally elastic rod sections. These rod sections are slidably and rotatably received in opposite ends of a sleeve 314. In this way, the hitch arms can be adjusted toward and away from one another, by sliding the rod sections 310 into and out of the sleeve 314, to vary the spacing between the hitch arms and thereby accommodate different widths of towing vehicles.

The vehicle 316 to be towed, which has been illustrated as a "camper," is attached to the sleeve in any suitable way. One manner of conveniently attaching the illustrated camper 316 to the sleeve 314 consists in welding a plate 318 to the sleeve and then bolting or otherwise attaching the frame of the camper to this plate. The rear end of the camper is shown as being supported by two ground-engaging swivel wheels 316a.

From this description, it is evident that the weight of the vehicle hitch 300 and the weight of the camper 316 carried by the hitch tend to cause the rear end of the hitch and the forward end of the camper to drop and thereby produce relative clockwise rotation of the sleeve 314 on the torsionally elastic rod sections 310, as the sleeve is viewed in FIG. 10. Extending through the free or inner ends of the rod sections 310 are cross pins 320. Opposite ends of each cross pin 320 are received in oppositely inclined slots 322 in the wall of the sleeve 314. It is evident that the torque exerted on the sleeve 314, tending to relatively rotate the latter on the rod sections 310, by the weight of the vehicle hitch 300 and the weight of the camper 316 carried by the hitch, is transmitted to the free ends of the rod sections 310 through the cross pins 320 and the walls of the slots 322. The torque exerted on the sleeve 314, therefore, tends to twist the rod sections 310. It will be seen, therefore, that the rod sections 310 act as torsion springs which yieldably retain the vehicle hitch 300 and the camper 316 in their normal horizontal positions of FIG. 8.

In the case of the vehicle hitch 300, it is desirable to keep the side sections 304 of the hitch arms 302 as short as possible. I have found, however, that in most automotive vehicles, the wider the vehicle is, the greater is the distance between the rear wheels of the vehicle and the rear end of the vehicle. Accordingly, when the vehicle hitch 300 of FIG. 8 is adjusted in width to accommodate a towing vehicle of a particular width, it is also generally necessary to adjust the length of the side sections 304 of the hitch arms 302. Now, it is evident that the longer the side sections 304 of the hitch arms, the greater must be the torque exerted by the torsion springs or rod sections 310 to hold the hitch and camper horizontal. Conversely, the shorter the side sections 304 of the hitch arms 302, the smaller must be the torque exerted by these torsion springs. This change in the stiffness of the torsion springs or rod sections 310 is accomplished by the slope of the slots 322 in the sleeve 314. Thus, when adjusting the vehicle 300 to a car of greater width and length, the length of the side sections 304 of the hitch arms 302 is increased and the rod sections 310 of the hitch arms are withdrawn from the sleeve 314 to increase the spacing between the hitch arms. It will be observed that the slope of the slots 322 in the sleeve 314 is such that as the rod sections 310 are withdrawn from the sleeve, they are twisted with respect to the sleeve in a direction to increase the resistance they offer to clockwise rotation of the sleeve, under the weight of the hitch and the camper. Conversely, when the vehicle hitch is adjusted in width to a relatively narrow towing vehicle, by shortening the side sections 304 of the hitch arms 302 and moving the rod sections 310 into the sleeve 314, to decrease the spacing between the hitch arms, the "pretwist" in the rod sections is decreased, thereby decreasing the spring resistance these rod sections offer against clockwise rotation of the sleeve.

Cut in the walls of the slots 322 in the sleeve 314 are a series of notches 324 for receiving the ends of the cross pins 320 to releasably hold the rod sections 310 in various positions of axial adjustment thereof with respect to the sleeve 314.

The vehicle hitch 400 of FIGS. 12 and 13 is substantially identical to the vehicle hitch 230 in FIG. 6 except that the ground-engaging wheel 238 in the latter hitch is replaced, in the vehicle hitch 400 of FIGS. 12 and 13, by a torque arm 402. One end of this torque arm is bent at right angles, as illustrated at 404, and is pivotally attached to the pivotally connected arms 406 and 408 of the hitch in any suitable way. The bent end 404 of the rod 402, for example, may conveniently form a pivot for the hitch arms 406 and 408. The ball part 410 of the ball and socket connection 412 between the vehicle hitch 400 and the trailer 414 to be towed may be rigidly joined to the upper extremity of the bent end 404 of the rod 402.

Extending through the rear end of the torque rod 402 is a hole 416 to receive a chain 418. The ends of this chain are secured to opposite sides of the body of the trailer 414, as illustrated. It is evident that the torque arm 402 and the chain 418 prevent the rear end of the vehicle hitch 400 and the forward end of the trailer 414 from dropping under the weight thereof. The illustrated torque arm and chain arrangement of FIGS. 12 and 13, then, replaces the ground-engaging swivel wheel 238 in the vehicle hitch 230 of FIG. 6.

It will be evident from the preceding description that either of the wheel coupling means 30 or 200 of this invention may be utilized in any one of the various hitches disclosed herein. For example, the wheel coupling means 200 may be used on the vehicle hitch 14 of FIG. 1 in lieu of the wheel coupling means 30 illustrated in that figure. Similarly, the wheel coupling means 30 can be used on the vehicle hitch 230 of FIG. 6 in lieu of the wheel coupling means 200 illustrated in that figure, and so on.

Figures 14, 15, 16, 17:
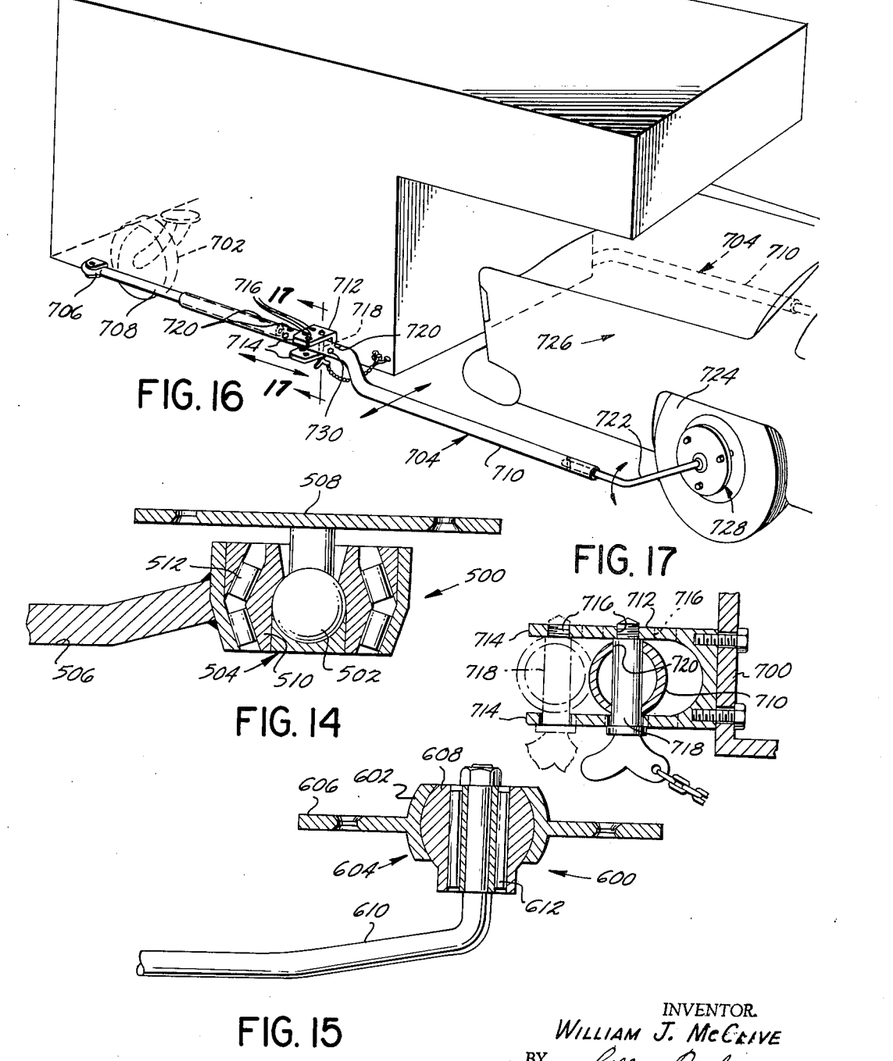
FIG. 14 is a section through a further modified wheel coupling means according to the invention.
FIG. 15 is a still further modified wheel coupling means according to the invention.
FIG. 16 is a view in perspective of a modified vehicle hitch according to the invention.
FIG. 17 is an enlarged section taken along line 17—17 in FIG. 16.

FIGS. 14 and 15 illustrate two additional alternative wheel coupling means which can be used on any of the vehicle hitches of the invention. In the wheel coupling means 500 of FIG. 14, the ball 502 of the ball and socket coupling 504 between the hitch arm 506 and the wheel coupling plate 508 is rigid on the latter. The socket 510 of the coupling 504 is rotatably supported on the hitch arm 506 by bearing means 512. In the wheel coupling means 600 of FIG. 15, the socket 602 of the ball and socket swivel coupling 604 is rigid on the wheel coupling plate 606. The ball 608 of the coupling 604 is rotatably supported on the hitch arm 610 by bearing means 612.

Final reference is made to FIGS. 16 and 17 in which numeral 700 denotes a camper body supported at its rear end by one or more swivel wheels 702 (only one shown). Hinged at their rear ends to the sides of the camper body 700, for horizontal swinging movement, are hitch arms 704. Only the hinge 706 for one arm 704 is shown.

The hitch arms 704 are identical so that only the near arm in FIG. 16 will be described. This hitch arm comprises a rear rod section 708 which carries the hinge 706 and a forward sleeve section 710 which slidably and rotatably receives the rod section 708. Sleeve section 710 fits within a bracket 712 fixed to the side of the camper body 700. The upper and lower flanges 714 of this bracket have a multiplicity of sets of aligned holes 716, the upper ones of which are threaded to receive a threaded pin 718.

Sleeve section 710 of the hitch arm 704 under discussion has a series of holes 720 therethrough and spaced therealong to receive the pin 718. When the pin 718 is removed, sleeve section 710 may obviously be axially adjusted, and/or the entire hitch arm may be swung out and in, to align any one of its holes 720 with any one of the hole sets in the bracket flanges 714. Pin 718 may then be inserted through the aligned holes to lock the hitch arm in position. The far hitch arm 704 in FIG. 16 is connected to the camper body 700 by a bracket 712 (not shown) so that the latter hitch arm can be similarly adjusted and locked in position.

It is obvious that axial adjustment of the sections 710 of the hitch arms 704 varies the length of the arms, while swinging the arms out and in varies the spacing between the forward ends of the arms. In this way, the vehicle hitch can be adjusted to different sized automobiles. The arrangement and spacing of the holes 716 and 720 in the bracket flanges 714 and hitch arm sections 710 permit the hitch arms to be locked in various positions of angular and axial adjustment.

Fastened at one end in the forward end of each hitch arm 704 is a bent torsion bar 722. The other end of each torsion bar is connected to a rear wheel 724 (only one shown) of the towing vehicle 726 by a wheel coupling means 728 (only one shown) which may be any one of the wheel coupling means described earlier but which preferably is the wheel coupling means 200 of FIG. 5. The bent torsion bars 722 obviously function as torsion springs which resiliently support the forward end of camper 700 on the towing vehicle 726.

It will be observed that when the wheel coupling means 728 are disconnected from the towing vehicle wheels and the hitch arm lock pins 718 are removed, the hitch arm sections 710 can be rotated to positions where the wheel coupling means 728 can rest on the ground to support the forward end of the camper. One additional hole 730, at right angles to holes 720, may be made through each hitch arm section 710 to receive the lock pins 718 for locking the hitch arms in the latter positions.

Clearly, then, the invention hereinbefore described and illustrated is fully capable of attaining the several objects and advantages preliminarily set forth.

While certain presently preferred embodiments of the invention have been disclosed, these are intended to be purely illustrative and not limiting in nature so that it should be understood that numerous modifications in the design, arrangement of parts, and instrumentalities of the invention are possible within the spirit and scope of the following claims.

What is claimed is:

1. In a hitch for attaching a vehicle to be towed to a towing vehicle, the combination comprising:

a wheel coupling plate having a multiplicity of holes arranged about and equally radially spaced from an axis normal to the plate for receiving studs secured to a rear wheel of the towing vehicle, a hitch arm extending transversely of said axis, and means mounting said plate on said arm for rotation of the plate about said axis and universal swivel movement of the plate about a swivel center located along said axis substantially in the plane of the plate including a socket element carried on said plate and containing a spherically curved socket having its center located approximately on said axis and in the plane of said plate and an element carried on said arm and swivelly received in said socket to form a universal swivel coupling between said plate and arm.

2. In a hitch for attaching a vehicle to be towed to a towing vehicle, the combination comprising:

a wheel coupling plate member having a multiplicity of holes arranged about and equally radially spaced from an axis normal to the plate for receiving studs secured to a rear wheel of the towing vehicle, a hitch arm member extending transversely of said axis, a universal swivel coupling having its swivel center located approximately on said axis and a given transverse axis of said arm member and including a socket element and an element swivelly received in said socket element, means fixedly mounting one of said elements on one of said members, and bearing means rotatably mounting the other element on the other member for turning on said axis of the latter member.

3. In a hitch for attaching a vehicle to be towed to a towing vehicle, the combination comprising:

a wheel coupling plate member having a multiplicity of holes arranged about and equally radially spaced from an axis normal to the plate for receiving studs secured to a rear wheel of the towing vehicle, a hitch arm member extending transversely of said axis, a universal swivel coupling having its swivel center approximately in the plane of said plate and approximately on said axis and a given transverse axis of said arm member and including a socket element and an element swivelly received in said socket element, means fixedly mounting one of said elements on one of said members, and bearing means rotatably mounting the other element on the other member for turning on said axis of the latter member.

4. In a hitch for attaching a vehicle to be towed to a towing vehicle, the combination comprising:

a wheel coupling plate member having a multiplicity of holes arranged about and equally radially spaced from an axis normal to the plate for receiving studs secured to a rear wheel of the towing vehicle, a hitch arm member extending transversely of said axis, a universal swivel coupling including a socket element carried on said plate member and an element carried on said arm member and swivelly received in said socket element, whereby said plate member can swivel with respect to said arm member, the swivel center of said coupling being located approximately on said axis and a given transverse axis of said arm member and approximately in the plane of said plate member, means rotatably mounting one of said elements on its respective member for turning on said axis of its respective member, and means rigidly mounting the other element on the other member.

5. In a hitch for attaching a vehicle to be towed to a towing vehicle, the combination comprising:

a wheel coupling plate having a multiplicity of holes arranged about and equally radially spaced from an axis normal to the plate for receiving studs secured to a rear wheel of the towing vehicle, a hitch arm extending transversely of said axis, a universal swivel coupling having its swivel center located approximately on said axis and in the plane of said plate and including a socket and an element swivelly received in said socket, means rotatably mounting said socket on said plate for turning on said axis, and means rigidly securing said element to said arm.

6. In a hitch for attaching a vehicle to be towed to a towing vehicle, the combination comprising:

a hitch frame including a pair of hitch arm members to straddle the rear wheels of the towing vehicle, a pair of coupling plate members at the ends of said arm members, respectively, each coupling plate member having a multiplicity of holes arranged about and equally radially spaced from an axis normal to the respective plate member to receive studs secured to a rear wheel of the towing vehicle, and means rotatably and swivelly mounting each plate member on the adjacent arm member comprising a universal swivel coupling having its swivel center located aprpoximately on said axis of the respective plate member and a given transverse axis of the respective arm member and including a socket element and a second element swivelly received in the respective socket element, bearing means rotatably mounting one of said elements of each coupling on one of the respective arm and plate members for turning on said axis of said one member, and means mounting the other element of each coupling on the other member of the respective coupling.

7. In a hitch for attaching a vehicle to be towed to a towing vehicle, the combination comprising:

a hitch frame including a pair of hitch arm members to straddle the rear wheels of the towing vehicle, a pair of coupling plate members at the ends of said arm members, respectively, each coupling plate member having a multiplicity of holes arranged about and equally radially spaced from an axis normal to the respective plate member to receive studs secured to a rear wheel of the towing vehicle, and means rotatably and swivelly mounting each plate member on the adjacent arm member comprising a universal swivel coupling having its swivel center located approximately in the plane of the respective plate member and on said axis of the respective plate member and a given transverse axis of the respective arm member and including a socket element carried by the respective plate member and a second element swivelly received in the respective socket element and carried by the respective arm member, means rotatably mounting one of said elements of each coupling on its respective member for turning on said axis of the latter member, and means mounting the other element of each coupling on its respective member.

8. In a hitch for attaching a vehicle to be towed to a towing vehicle, the combination comprising:
   a hitch frame including a pair of hitch arms to straddle the rear wheels of the towing vehicle,
   a pair of wheel coupling plates at the ends of said arms, respectively,
   each coupling plate having a multiplicity of holes arranged about and equally radially spaced from an axis normal to the respective plate for receiving studs secured to a rear wheel of the towing vehicle, and
   means rotatably and swivelly mounting each plate on the respective arm comprising a universal swivel coupling having its swivel center approximately on said axis and in the plane of the respective plate and including a socket and an element swivelly received in said socket, bearing means rotatably mounting said socket on the respective plate for turning on said axis of the respective plate, and means mounting said element on the respective arm.

9. In a hitch for attaching a trailer to a towing vehicle, the combination comprising:
   a hitch frame including a pair of torsionally elastic hitch arms adapted to straddle the rear wheels of the towing vehicle,
   a pair of wheel coupling plates between and laterally offset from the forward ends of said arms,
   means rotatably mounting each plate on its adjacent arm for turning on a transverse axis of the respective arm including a universal swivel coupling having its swivel center located approximately on the turning axis of the respective plate, and
   each plate having a series of holes arranged about the turning axis thereof to receive lug bolts for attachment to a rear wheel of the towing vehicle.

References Cited by the Examiner

UNITED STATES PATENTS

| | | | |
|---|---|---|---|
| 738,884 | 9/03 | Clay | 280—503 |
| 1,330,289 | 2/20 | Thurmond | 280—483 X |
| 1,889,297 | 11/32 | Russell | 280—511 |
| 1,986,149 | 1/35 | Harris | 280—511 X |
| 2,255,624 | 9/41 | Luse | 280—483 |
| 2,471,462 | 5/49 | Toth | 280—47.31 X |

FOREIGN PATENTS

| | | |
|---|---|---|
| 1,000,496 | 10/51 | France. |
| 653,996 | 5/51 | Great Britain. |

A. HARRY LEVY, *Primary Examiner.*
LEO FRIAGLIA, *Examiner.*